United States Patent
Zhang

(10) Patent No.: US 7,264,828 B2
(45) Date of Patent: Sep. 4, 2007

(54) PROCESS OF EXTRACTING SMALL MOLECULAR INGREDIENTS FROM BIOLOGICAL MATERIALS UNDER SUPER HIGH PRESSURE

(76) Inventor: Shouqin Zhang, Biology and Agricultural Engineering College, Jilin University No. 142, Renmin Street, Jilin Province, Changchun (CN) 130025

( * ) Notice: Subject to any disclaimer, the term of this patent is extended or adjusted under 35 U.S.C. 154(b) by 339 days.

(21) Appl. No.: 10/500,531

(22) PCT Filed: Dec. 30, 2002

(86) PCT No.: PCT/CN02/00929

§ 371 (c)(1),
(2), (4) Date: Jun. 30, 2004

(87) PCT Pub. No.: WO03/059362

PCT Pub. Date: Jul. 24, 2003

(65) Prior Publication Data

US 2005/0079481 A1    Apr. 14, 2005

(30) Foreign Application Priority Data

Dec. 30, 2001    (CN) .............................. 01 1 38981

(51) Int. Cl.
*A61K 36/00* (2006.01)
*A61K 36/16* (2006.01)
*A61K 36/82* (2006.01)
*A61K 36/539* (2006.01)

(52) U.S. Cl. .................... 424/725; 424/729; 424/741; 424/752

(58) Field of Classification Search ............... 424/400, 424/725, 729, 752, 741; 435/41, 183, 325, 435/243
See application file for complete search history.

(56) References Cited

FOREIGN PATENT DOCUMENTS

JP          04244203 A  *  9/1992
JP          04256405 A  *  9/1992
JP          09140337 A  *  6/1997

OTHER PUBLICATIONS

"High pressure treatment of foods", Wageningen UR—Agrotechnology & Food Sciences Group—Research.*
Brown et al., "Ultra high pressure inactivation of prion infectivity in processed meat:A practical method to prevent human infection", PNAS, May 2003, vol. 100, No. 10, pp. 6093-6097.*
CN1049867A—Extraction Method of Active Principle from Fungal Mycelium—Abstract only.
CN1216232A—Extraction of Aloe Extract—Abstract only.

* cited by examiner

Primary Examiner—Ruth A Davis
(74) Attorney, Agent, or Firm—Alix, Yale & Ristas, LLP

(57) ABSTRACT

The process of extracting small molecular ingredients from biological materials under super high pressure is a process which makes use of super high pressure to extract small molecular active ingredients from biological materials, especially natural products, which mainly consists of extracting the mixture of solid raw material and extraction solvent under increased pressure. Said process comprises the following steps: the step of pretreatment, crash and formulation; the step of closure, charging the formulated mixture of raw material and extraction solvent into high pressure container, then closing the high pressure container; the step of increasing pressure, increasing the pressure of the high pressure container from 100 Mpa to the predefined pressure of 1000 Mpa; the step of holding pressure, holding the predefined pressure for 3-30 minutes; the step of releasing pressure, releasing the pressure of the high pressure container to normal pressure, removing the mixture. The present invention modifies the traditional extraction process of small molecular ingredients in biological materials, which not only makes extracts avoiding heating, but also has the advantages of high extraction yields, rapid extraction and broad extraction solvents.

16 Claims, 2 Drawing Sheets

PROCESS OF EXTRACTING SMALL MOLECULAR INGREDIENTS FROM BIOLOGICAL MATERIALS UNDER SUPER HIGH PRESSURE

The present application is the U.S. National Phase of PCT International Application No. PCT/CN02/00929 filed Dec. 30, 2002 which claims the benefit of Chinese Patent Application No. 01138981.8 filed Dec. 30, 2001.

FIELD OF THE INVENTION

The present invention relates to a process of extracting from biological materials under super high pressure, especially to a process of extracting small molecular active ingredients from biological materials under super high pressure.

The biological materials include the total, partial, tissue, partial tissue or other parts of plants, animals and microorganisms.

The small molecules include the molecules that comprise fewer atoms with lower molecular weight. Generally, the molecular weight is lower than 10,000.

The active ingredients include the components that can be used for treatment of diseases, physiological accommodation, improvement of health, promotion of growth, as well as improvement of color, flavour and taste of food, etc. Natural produces comprise many kinds of active ingredients, such as alkaloids, glucosides, organic acids, volatile oils, terpenoids, flavonoids, steroids, oligosaccharides, polysaccharides, coumarins, lignins, saponin, amino acids, peptides and proteins, enzymes, tannins, resin, pigments of plant, oils, wax, inorganic salts, etc. These active ingredients are generally divided into hydrophilic and lipophilic substance according to their solubility. Many ingredients will be inactive or active lowered after heating.

The super high pressure, said in the invention, is hydrostatic pressure of 100 MPa~1000 MPa.

BACKGROUND OF THE INVENTION

There are many methods of extracting active ingredients from biomaterials. The methods for extracting active ingredients from natural products are solvent exaction (including immersion, leaching, refluxing, boiling), vapour distillation and sublimation, Gao Yuanjun, The development and processing of the wild plants in China, Chinese light industry press, Beijing, 1997.February. The methods to extract natural components are the solvent technology, vapour distillation, and sublimation. The latter two are limitedly used, the solvent technology is used in most conditions, Yao xinsheng, Chemistry of natural drugs, People's Medical Publishing House, Beijing, 1998.June. These methods have many advantages, for example, many kinds of solvent can be used, many active ingredients can be obtained and the extraction yield is higher. However, there are also many shortages, for example, difficulty of separating and purifying, largely denaturing of the active ingredients, much loss of the ingredient by volatilization, and long extraction time, etc. Although several technologies have been developed recently, such as enzyme technology, ultra-micro-pulverizing technology etc., the above shortages are not be eradicated.

The newest technology supercritical $CO_2$ extraction has solved some of the above problems, particularly has a notable advantage of separation and purification, and accordingly has become a very important extraction technology. However, Zhu Zhiqiang described in Supercritical fluid technology, principle and application, Chemical industry press, Beijing, 2000.March: $CO_2$ has lipophilic property. The fragrant oils, fat, alcohol, aldehyde, ketone, wax, the light fraction of resin can be selectively extracted by supercritical $CO_2$, —saccharides and salts are insoluble in supercritical $CO_2$. The solubility of alkaloids, polysaccharides, steroids, terpenoids, glycosides, saponin or flavonoids, etc. in supercritical $CO_2$ is very poor, which makes it difficult for these substances to be extracted by supercritical $CO_2$ exaction. Additionally, alkaloids, nicotine and caffeine may react with other components, such as citric acid and caffetannic acid, to form salts, which causes it difficult to extract these ingredients by supercritical $CO_2$. In addition, there are other disadvantages of supercritical $CO_2$ extraction, for example, expensive equipment and high cost of operation.

DESCRIPTION OF THE INVENTION

This invention provides a new process of extracting small molecular ingredients from biomaterials under super high pressure with high extraction yield and short extraction time to overcome the disadvantages of present extraction methods.

The process of extracting small molecular ingredients from biomaterials according to the invention is a process of extracting small molecular ingredients form the mixture of the solid raw biomaterial and solvent under super high pressure. The procedures are as follows:

The step of pretreatment, crashing and formulation: the solid raw biomaterial is pretreated first, including roguing, cleaning, or macerating, and then crashed. Finally mix the crashed biomaterials with proper solvent by the proper ratio homogeneously.

The step of closure: put the above mixture into the high pressure container firstly and then close the container. Alternatively, close the container firstly and then charge the mixture into the container.

The step of increasing pressure: The pressure of the pressure container is increased from normal pressure to the predefined pressure of 100 MPa~1000 MPa.

The step of holding pressure: The predefined pressure is held for 3-30 minutes.

The step of releasing pressure: The pressure of the pressure container is released to the normal pressure, and the mixture is removed from the container.

Alternatively, in the step of closure, the mixture is first poured into a packing container which is then airproofed, after that, put the packing container into the pressure container and close it. Charge the medium for transferring pressure into the pressure container. The pressure of the pressure container is increased via the medium by a pump. After holding for a period of time, release the pressure of container, and remove the packing container and the mixture therein. The packing container may be made of flexible material, such as plastic film or paper. It also may be made of hard materials, such as metal or glass. The packing container must be pressure transferrable without breakage, osmosis and leakage under super high pressure. Additionally, it does not react with solvent, raw biomaterials and medium for transferring pressure.

The steps of increasing pressure, holding pressure and releasing pressure can be finished by one step or several steps. If finished by several steps, it can be done as the following:

① To increase the pressure in a ladder-type: increasing pressure in a ladder-type means that pressure is increased to the first predefined pressure, and hold for certain period time, then the pressure is increased to the second predefined higher pressure, and hold certain period time again, after that the pressure is increased again, thus repeat until reach the highest predefined pressure, and hold for certain time, then release the pressure.

② To increase pressure in a pulse-type: increasing pressure in a pulse-type means that the pressure is increased to the first predefined pressure, and hold for certain period time, release the pressure. The pressure is increased again to the second predefined pressure, hold for certain period time again and release the pressure. Thus repeat several times. The pressure reached each time may be same or not. The mixture is removed from the container after releasing the pressure at last time.

③ The raw biomaterial may be extracted one time or several times, i.e., the raw material which has been extracted under super high pressure is mixed with solvent and extracted once again under super high pressure. Such extraction can be repeated several times and the solvent can be the same or not each time.

One or more devices may be placed in the pressure container so that the super high pressure can work combined with other processing technologies. The devices may be ultrasonator, electric pulser, machine stirrer, heater, or cooler, etc. Such devices can work at any step, several steps or total steps of before increasing pressure, increasing pressure, holding pressure, releasing pressure or after releasing pressure.

The above devices may also be used outside the pressure container before extraction. At such circumstance, the processing technologies by use of the above devices are called prior treatment.

The extraction solvent of the invention includes water and/or organic solvent, or the mixture thereof. The organic solvent may include alcohols (for example, methanol, ethanol, isopropyl alcohol, butanol, etc.), ether (for example, dioxane, diethyl ether, petroleum ether, etc.), alkane halide (for example, chloroform, dichloromethane, etc.), ketone (for example, acetone, etc.), hydrocarbon (for example, hexane, industrial solvent oil, etc.), acids (for example, acetic acid, fatty acid etc.), amine (for example, ethanol amine, etc. ), and the mixture thereof.

The medium for transferring pressure of the invention is liquid, which is the same or not with extraction solvent.

At the step of pretreatment, crashing and formulation, some chemicals and/or bio-products as auxiliary additives may be added into the mixture of raw material and solvent. The auxiliary additive added may be one or more kinds. The auxiliary additives may be act as cosolvent, restrainer, precipitating agent or reactant to improve the performance of extraction under super high pressure, or to change structures of the extract.

During extraction under super high pressure, the temperature may be increased or reduced. The medium for transferring pressure and/or the mixture of raw material and solvent are heated with heater and cooled with cooler. The heater and/or cooler are sometimes placed or assembled in the pressure container. Sometimes, the pressure container is put into cooler to cool the mixture and/or medium.

The advantages of the invention are as follows:

A. The extraction solvent has broad scope, including water and/or organic solvent and the mixture thereof. Therefore, the most proper solvent can be selected as extraction solvent. The present invention has the advantage of using much more kinds of solvent over supercritical $CO_2$ extraction.

B. The extraction under high pressure is operated at room temperature during which the change of temperature is within 5° C. except of being heated or cooled. So, the extraction process according to the present invention has not the shortages of reaction, denaturation, or loss of the active ingredients which appeared in the common heat extraction such as refluxing, immersion, leaching, boiling and distilling. Thus, it is very useful for extracting heat sensitive ingredients. Sometimes, the extraction under high pressure is combined with heating or cooling to improve the performances of extraction, such as increasing the extract yield, changing the ingredients of extract, etc.

C. Theoretically, the solubility of most compounds increases with the increase of pressure. The pressure of the extraction of the present invention is above 100 MPa which is far higher than that of the common extraction and supercritical $CO_2$ extraction (usually about 10 MPa). Thus, the solubility of the bioactive ingredients is much better and the extract yield is much higher accordingly.

D. Under super high pressure, the cell membranes are ruptured, and the active ingredients in the cell can easily enter into the solvent, and the solvent also can easily enter into the cell. Thus, the extraction time is greatly shortened. Using the routine methods of extraction, the time of extraction is much longer. In general, the time of cool immersion and enzymolysis is from one day to several days; the extraction time of refluxing, boiling or distilling is 6~8 hour; and the extraction time of supercritical $CO_2$ is about 2 hour or more. However, the extraction time under super high pressure is generally 2~15 minutes, and the maximum is no more than 30 minutes.

E. Under super high pressure, the protein and starch are denatured, but not cleaved, which makes separation and purification more simple and convenient.

F. The process according to the invention can be used to extract many kinds of active ingredients. The medium for transferring pressure can be the same or not with the solvent. The pressure equipment is easy to be operated and controlled. Furthermore, the pressures everywhere of the pressure container are equivalent, which makes the extraction conditions constant. The pressure equipment can be used for extracting various kinds of active ingredients with various kinds of solvents.

G. Because the solubility of ingredients increases under super high pressure, less solvent is needed. The pollutant released is greatly decreased than other extraction methods.

H. Energy is saved in the process of the invention. One reason is that there is no energy consumption at the step of holding pressure. Additionally the compressibility of liquid is less, and the energy to compress liquid is far less than that to raise temperature and to compress $CO_2$ into supercritical state.

DETAILED DESCRIPTION OF THE EMBODIMENTS

Figure 1:
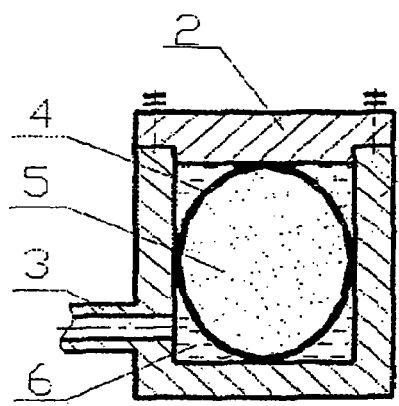
FIG. 1 is the sketch of extracting from the mixture of raw material and solvent in a packing container under high pressure via medium for transferring pressure.
Figure 6:
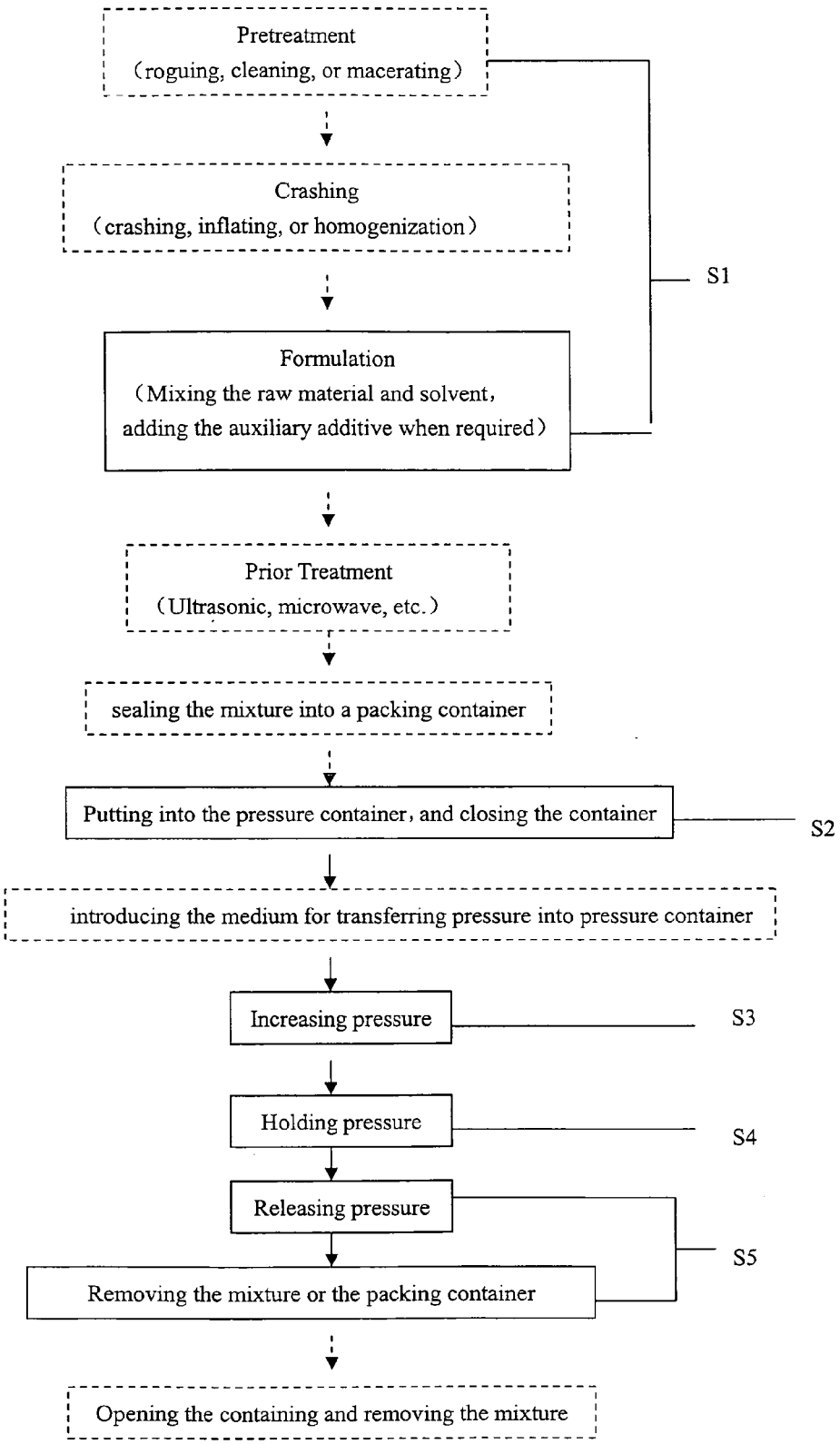
FIG. 6 is the flow chart of extracting under super high pressure.

The details of the process of the invention are further explained with reference to the drawing as following:

FIG. 6, the flow chart of extracting under super high pressure shows that the procedures of the process of extracting activity ingredient are as the following: The step of pretreatment, crashing and formulation (S1) is that the solid raw biomaterial is pretreated first, including roguing, cleaning, or macerating, and then is crashed, inflated, or homogenized, and mixed with solvent by the proper ratio. If the auxiliary additive is required, it can be added during mixing the raw material and solvent. If the prior treatment is required, it should works at this step. Finally, charge the mixture into the packing container and make it airtight. The step of closure (S2) is: put the formulated mixture of step (S1) into the pressure container firstly, and then close the container. Either way, the mixture is poured into a packing container, which is then airproofed, and finally put the packing container into the pressure container and close it, and after that, the medium for transferring pressure is charged into. The step of increasing pressure (S3) is that the pressure of the pressure container is increased from normal pressure to the predefined pressure of 100 MPa~1000 MPa at room temperature. The step of holding pressure (S4) is that the predefined pressure is held for 3-30 minutes. The step of releasing pressure (S5) is that the above predefined pressure is released to the normal pressure, the container is opened and the mixture is removed therefrom.

The steps drawn by dotted line in FIG. 6 can be used totally, or partially, or not used at all according to the raw materials or the active ingredients.

As shown in FIG. 1, the mixture of raw material and solvent (5) is put into a packing container (4) which is then airproofed, and then the container (4) is put into the high pressure container (1) which is then closed with the end-lid (2). The medium for transferring pressure (6) is introduced into the container (1) through the connecting tube line (3). The medium (6) is pressed by pump or supercharger to increase the pressure of container (1) to the predefined pressure of 100 MPa~1000 MPa. The predefined pressure is held for 3-30 minutes, and then released to normal pressure. The end-lid (2) is removed, and the packing container (4) is taken from the container (1), and then the mixture of raw material and solvent (5) is removed from the container (4).

Figure 2:
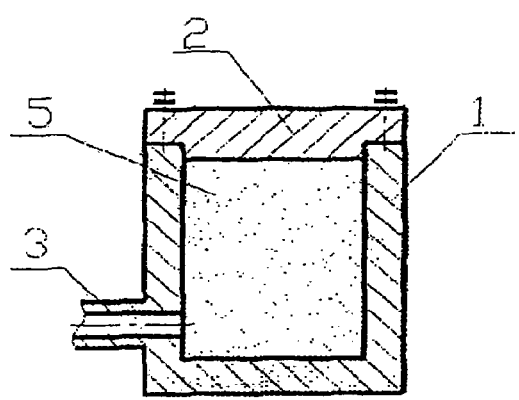
FIG. 2 is the sketch of extracting directly from the mixture of raw material and solvent under high pressure.

As shown in FIG. 2, the mixture of raw material and solvent (5) is charged into the high pressure container (1) and then the container (1) is closed with the end-lid (2). The pressure of container (1) is increased to the predefined pressure of 100 MPa~1000 MPa by pump or supercharger. After that, the steps of holding pressure and releasing pressure proceed. Alternatively, the pressure container (1) is closed with lid (2) firstly, and then the mixture (5) is introduced into the container (5) through connecting tube (3) by pump or supercharger. After that, steps of increasing pressure, holding pressure and releasing pressure proceed.

Figure 3:
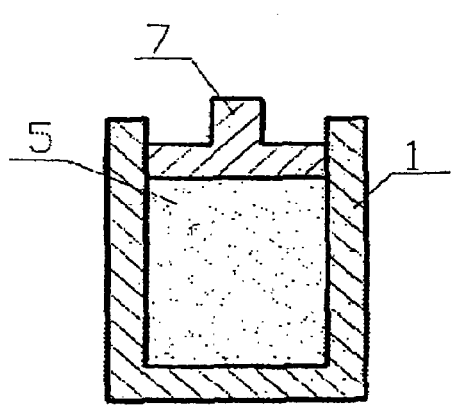
FIG. 3 is the sketch of extracting from the mixture of raw material and solvent under high pressure by the movement of piston.

As shown in FIG. 3, the mixture of raw material and solvent (5) is charged into the pressure container (1), but the end-lid (2) of FIG. 2 is replaced by the piston (7). The steps of increasing pressure, holding pressure and releasing pressure are accomplished by the movement of piston (7).

Figure 4:
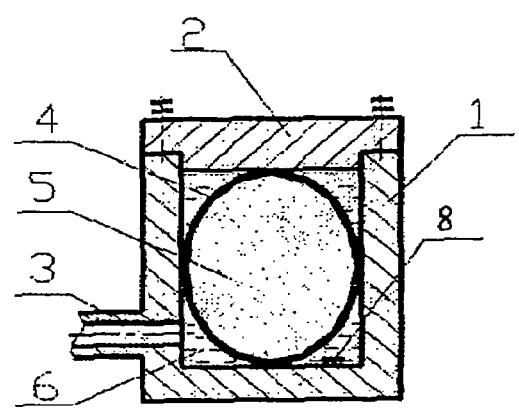
FIG. 4 is the sketch of a pressure container of FIG. 1 containing other devices.

As shown in FIG. 4, the device (8) is placed or assembled in the high pressure container (1) of FIG. 1, wherein the mechanical stirrer is not included in the device (8).

Figure 5:
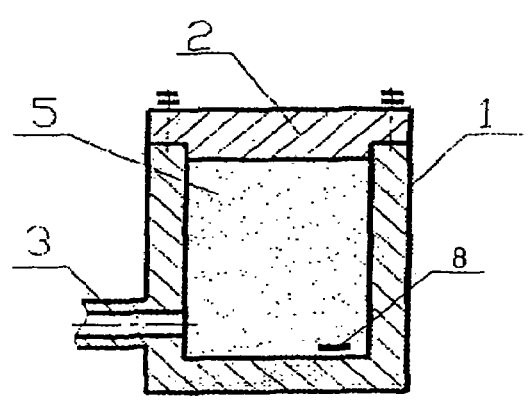
FIG. 5 is the sketch of a pressure container of FIG. 2 containing other devices.

As shown in FIG. 5, the device (8) is placed or assembled in the high pressure container (1) of FIG. 2, wherein the mechanical stirrer is included.

EXAMPLES

Example 1

To extract flavonoids from the gingko leaves:

Take off the impurities in gingkgo leaves, and crash the gingko leaves into powder with a pulverizer, and then mix 1 g powder with 100 ml water. The mixture is sealed into a plastic film bag which is then put into the high pressure container. Close the container, and then introduce the mixture of kerosene and transformer oil as medium for transferring pressure. Increase the pressure of the pressure container to 500 MPa via the medium by a supercharger. Hold this pressure for 10 minutes, and then release it to normal pressure. The container is opened and the mixture is removed from the bag.

The comparing results of extracting under super high pressure and the routine extraction technologies are shown as following:

| No. | Formulated mixture | Extraction technology | The content of flavonoids in the fluid extract |
|---|---|---|---|
| 1 | 1 g gingko leaves + 100 ml water | Super high pressure 500 MPa, 10 minutes | 3.10 mg/ml |
| 2 | 1 g gingko leaves + 100 ml water | Boiling (1 hour) | 2.43 mg/ml |

Example 2

To extract the tea polyphenols from the tea leaves

Style 2: Take off the impurities in tea leaves and crash tea leaves into powder. Mix 3 g powder of tea leaves with 540 ml water and 0.5 ml of 75% ethanol as the auxiliary additive. The above mixture is sealed into a plastic film bag which is then put into the pressure container. Close the container, and then introduce the mixture of kerosene and transformer oil as medium for transferring pressure. Increase the pressure of the pressure container to 460 MPa via the medium by a supercharger. Hold this pressure for 10 minutes, and then release it to normal pressure. The container is opened and the mixture is removed from the bag.

Style 3: Take off the impurities in tea leaves and crash the tea leaves into powder. Mix 3 g powder of tea leaves with 360 ml of 80% ethanol. The above mixture is sealed into a plastic film bag which is then put into the pressure container. Close the container, and then introduce water as the medium for transferring pressure. Increase the pressure of the pressure container to 380 MPa via the medium by a supercharger. Hold this pressure for 10 minutes, and then release it to normal pressure. The container is opened and the mixture is removed from the bag.

The results, obtained by the extraction technology under super high pressure and the routine extraction technologies are shown respectively as following:

| No. | Formulated mixture and Extraction technology | The content of tea polyphenols in the fluid extract |
|---|---|---|
| 1 | 3 g tea leaves + 500 ml water Boiling, 1 hour | 24.0 mg/ml |
| 2 | 3 g tea leaves + 540 ml water Super high pressure of 460 MPa, 10 minutes | 18.68 mg/ml |
| 3 | 3 g tea leaves + 360 ml 80% ethanol Super high pressure 380 MPa, 10 minutes | 28.0 mg/ml |

Example 3

To Extract Baicalein from Radix Scutellariae

Take off the impurities in Radix Scutellariae; and crash the Radix Scutellariae with pulverizer. Mix 5 g powder of Radix Scutellariae with 100 ml of 60% methanol. Treat the mixture for 10 minutes with a ultrasonator. The above mixture is sealed into a plastic film bag which is immersed for 4 hours at room temperature. Put the bag into the pressure container, and close the container. Then introduce the mixture of kerosene and transformer oil as medium for transferring pressure. Increase the pressure of the pressure container to 200 MPa via the medium by a supercharger. Hold this pressure for 5 minutes, and then release it to normal pressure. Increase the pressure of the pressure container to 600 MPa. Hold this pressure for 5 minutes, and then release it to normal pressure. The container is opened and the mixture is removed from the bag.

The results, obtained by the extraction technology under super high pressure and the routine extraction technologies are shown respectively as following:

| No. | Formulated mixture | Extraction technology | The content of Baicalein in the fluid extract |
|---|---|---|---|
| 1 | 5 g Radix Scutellariae + 100 ml methanol | Under super high pressure | 3.10 mg/ml |
| 2 | 5 g Radix Scutellariae + 100 ml methanol | Heat till reflux at 100° C., 2.5 h. | 1.23 mg/ml |

INDUSTRIAL APPLICABILITY

The process for extracting small molecular ingredients from biological materials under super high pressure according to the invention is usually operated at room temperature. Thus, the denatured and loss of the active ingredients caused by heating are avoided. A large range of solvents can be used in this technology to extract the hydrophilic and lipophilic active ingredients. Additionally, it has advantages such as shorter extraction time, higher extract yield, easier to be separated and purified. It is a fast extraction technology with high-yield for small molecular active ingredients.

What is claimed is:

1. A process of extracting small molecular ingredients with molecular weight lower than 10,000 from a biological material under super high pressure, comprising the following steps:

pretreating the biological material by pulverizing and then mixing with a first portion of solvent to obtain a first mixture;

adding the first mixture into a pressure container;

closing the container;

increasing pressure in the pressure container from atmospheric pressure to a predefined pressure of 100 MPa-1000 Mpa at a temperature within 5° C. of room temperature;

holding the predefined pressure for 3-30 minutes;

releasing pressure in the pressure container; and removing the first mixture from the container;

wherein the small molecular ingredients comprise flavonoids extracted from ginkgo leaves, polyphenols extracted from tea leaves or baicalein.

2. The process according to claim 1, further comprising the steps of:

adding the first mixture into a packing container, sealing the packing container and subsequently putting the packing container into the pressure container;

adding a medium for transferring pressure into the pressure container; and removing the first mixture from the packing container after releasing pressure in the pressure container.

3. The process according to claim 2, wherein the medium is liquid.

4. The process according to claim 1, further comprising the step of increasing pressure in the pressure container to a predefined pressure of 100 MPa-1000 MPa for a second time.

5. The process according to claim 1 wherein, the step of increasing pressure in the pressure container is done in a ladder-type fashion.

6. The process according to claim 1, wherein the step of increasing pressure in the pressure container is done in a pulse-type fashion.

7. The process according to claim 1, wherein the biological material is removed from the first solvent and is mixed with a second portion of a second solvent to obtain a second mixture that is added into the pressure container and the steps of increasing pressure, holding pressure and releasing pressure are repeated with the second mixture, wherein the first solvent and the second solvent can be the same or different.

8. The process according to claim 1, wherein the process further comprises other processing technologies selected from the group consisting of ultrasonic processing, electric pulse processing and mechanical agitation.

9. The process according to claim 1, wherein said solvent comprises water, an organic solvent, or the mixture thereof.

10. The process according to claim 1, further comprising adding an auxiliary additive into the first mixture.

11. The process according to claim 1, further comprising the step of cooling the pressure container.

12. The process according to claim 11, wherein the step of cooling is accomplished by disposing a cooler within the pressure container.

13. The process according to claim 11, wherein the step of cooling is accomplished by placing the pressure container into a cooler.

14. The process according to claim 1, wherein, the step of increasing pressure is performed in steps.

15. The process according to claim 1, wherein, the step of releasing pressure is performed in steps.

16. The process according to claim 1, wherein, the step of increasing pressure is performed at room temperature.

* * * * *